United States Patent
Glenske et al.

(10) Patent No.: US 11,846,347 B2
(45) Date of Patent: Dec. 19, 2023

(54) WEAR MONITORING DEVICE AND BALL SCREW DRIVE

(71) Applicant: Sensitec GmbH, Wetzlar (DE)

(72) Inventors: Claudia Glenske, Leungermany (DE); Sebastian Weber, Wetzlar (DE)

(73) Assignee: Sensitec GmbH, Wetzlar (DE)

( * ) Notice: Subject to any disclaimer, the term of this patent is extended or adjusted under 35 U.S.C. 154(b) by 534 days.

(21) Appl. No.: 17/255,154

(22) PCT Filed: Jun. 19, 2019

(86) PCT No.: PCT/EP2019/066204
§ 371 (c)(1),
(2) Date: Dec. 22, 2020

(87) PCT Pub. No.: WO2020/002092
PCT Pub. Date: Jan. 2, 2020

(65) Prior Publication Data
US 2021/0270357 A1    Sep. 2, 2021

(30) Foreign Application Priority Data
Jun. 29, 2018    (DE) .......................... 102018115847.5

(51) Int. Cl.
*F16H 57/01* (2012.01)
*G01B 7/12* (2006.01)
*F16H 25/22* (2006.01)

(52) U.S. Cl.
CPC ......... *F16H 57/01* (2013.01); *F16H 25/2204* (2013.01); *G01B 7/125* (2013.01)

(58) Field of Classification Search
CPC ....... F16H 57/01; F16H 25/2204; G01B 7/12; G01B 7/125
See application file for complete search history.

(56) References Cited

U.S. PATENT DOCUMENTS 3,883,796 A * 5/1975 Holt .......................... G01B 7/12
331/65
4,103,222 A   7/1978 Phillips et al.
(Continued)

FOREIGN PATENT DOCUMENTS

DE    3721127 A1    1/1989
DE    4136527 A1    5/1992
(Continued)

OTHER PUBLICATIONS

International Search Report dated Sep. 20, 2019; International Application No. PCT/EP2019/066204.

*Primary Examiner* — Charles A Fox
*Assistant Examiner* — Gregory T Prather
(74) *Attorney, Agent, or Firm* — DINSMORE & SHOHL LLP

(57) ABSTRACT

A wear monitoring device for rolling elements in a machine element has at least one magnet generating a measuring magnetic field, and a magnetic field sensor arrangement for measuring a flux density of the measuring magnetic field. The sensor arrangement has at least one first magnetic field sensor for measuring the flux density at a first measuring position and a second magnetic field sensor for measuring the flux density at a second measuring position at a distance from the first measuring position. The measuring positions are selected such that rolling elements passing the measuring positions are in close contact with one another and a resulting change in the measuring magnetic field is detectable at a measuring position by the respective magnetic field sensor. An evaluation unit records and evaluates the flux densities measured by the magnetic field sensors, to determine diameters and/or changes in the diameters of the rolling elements.

17 Claims, 6 Drawing Sheets

(56) References Cited

U.S. PATENT DOCUMENTS

| | | | | |
|---|---|---|---|---|
| 5,006,798 A | * | 4/1991 | Matsuki | G01B 7/003 324/207.17 |
| 7,930,949 B2 | * | 4/2011 | Singh | F16H 25/20 74/424.82 |
| 2008/0257080 A1 | * | 10/2008 | Singh | F16H 25/20 74/89.23 |

FOREIGN PATENT DOCUMENTS

| | | |
|---|---|---|
| DE | 69011907 T2 | 1/1995 |
| DE | 102010017113 A1 | 12/2011 |

\* cited by examiner

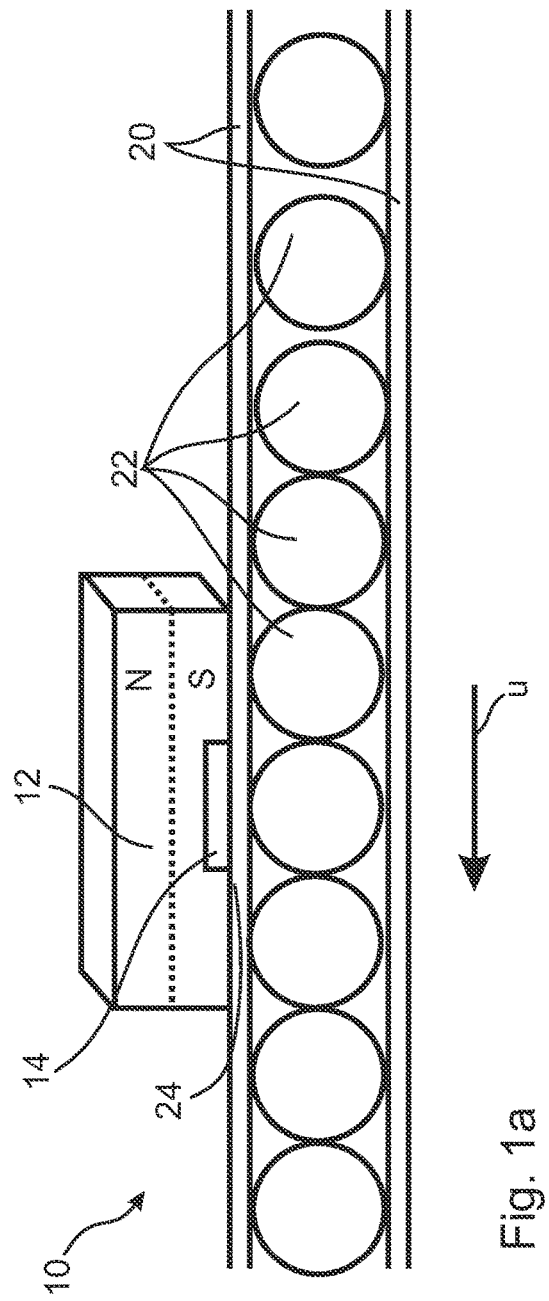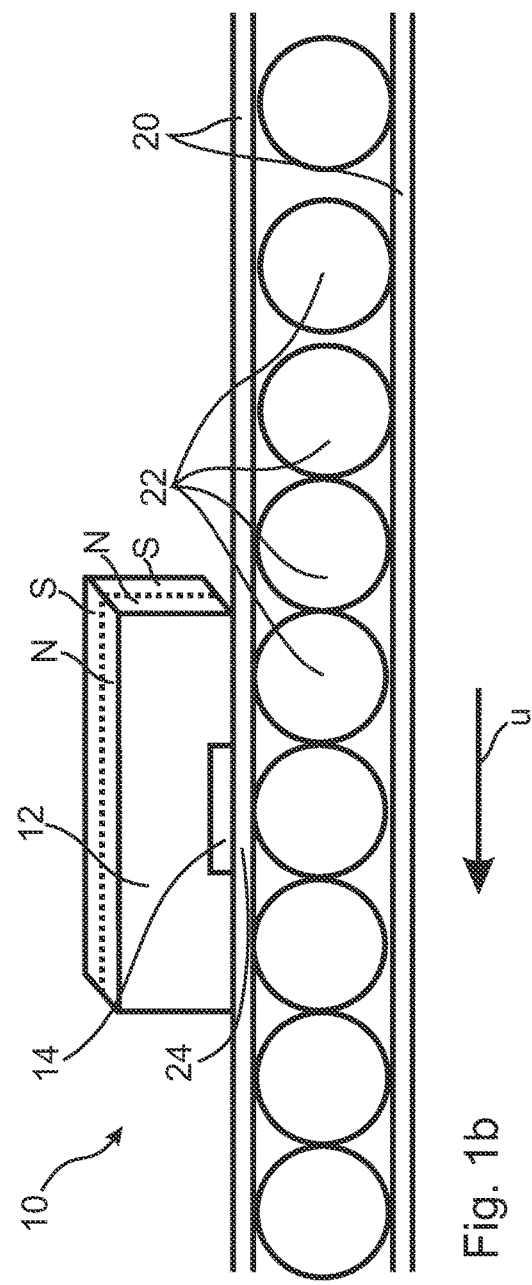

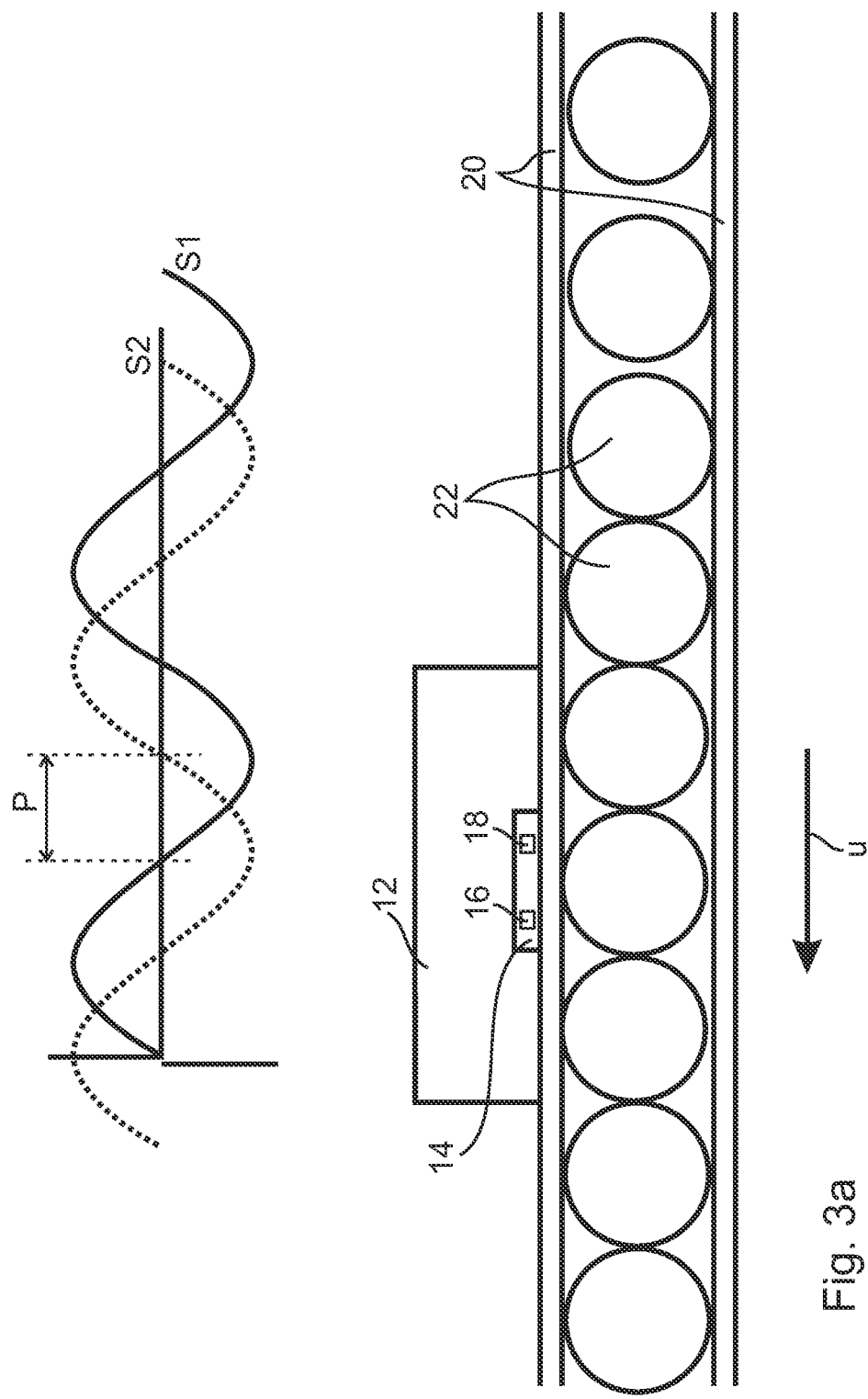

WEAR MONITORING DEVICE AND BALL SCREW DRIVE

CROSS-REFERENCE TO RELATED APPLICATIONS

This application is the U.S. national stage of PCT/EP2019/066204 filed Jun. 19, 2019, which claims priority of German patent application 102018115847.5 filed Jun. 29, 2018, both of which are hereby incorporated by reference in their entirety.

FIELD OF THE INVENTION

The present invention relates to a wear monitoring device for a machine element which has a succession of ferromagnetic rolling elements, in particular for a ball screw or a linear bearing, for wear monitoring of the rolling elements.

BACKGROUND OF THE INVENTION

In various mechanical applications, machine elements, for example bearings, guideways, gears or drives are used in which rolling elements reduce friction between the various components of the machine element, for extreme facilitation of the movement of the different components of the machine element relative to one another. The rolling elements used can be balls, rollers, spherical rollers, needles, cones or other rotation elements, for example, and can be manufactured from steel, ceramics or special extra-hard plastics, for example. In some versions of such machine elements, rolling element cages are provided which separate the individual rolling elements from one another.

In other machine elements, however, the use of such rolling element cages is not possible. These machine elements have, for design reasons, an endless succession of rolling elements in which the rolling elements circulate in a closed cycle. The rolling elements are often, proceeding from a starting point, subjected to load with friction reduction only in one direction and are conveyed in the opposite direction without load through a return channel back to the starting point. As a rule, the rolling elements in this succession are almost up against one another, but to ensure a certain clearance one to three rolling elements fewer are arranged than would be permitted by the maximum rolling element capacity in the succession. Examples for such machine elements are ball screws or linear bearings.

The rolling elements are subject to wear during operation of the machine element, which leads to a clearance between the components of the machine element, for example a bearing clearance, increasing as the operating duration increases. This can lead to a total failure of the machine element, which may result in damage to a higher-level machine and/or destruction of a machined workpiece.

DE 10 2010 017 113 A1 shows a ball screw, inside the nut of which—referred to as a moving element—a sensor device with a magnetic element and a Hall element is provided. This allows the circulation frequency of the rolling elements to be determined and compared with a predefined value, where an alarm can be emitted when this value is undershot. It can furthermore be determined whether or not a bias exists between the rolling elements and the channel. If there is a bias, the rolling elements roll inside the channel, while if there is no bias the rolling elements slide in the channel, leading to the recorded circulation frequency not being periodic. However this does not address either wear determination for the rolling elements themselves, nor is that possible with a device presented there, so that wear of the rolling elements cannot be taken into account during position detection of the ball screw.

DE 690 11 907 T2 indicates a position detection device for a ball screw or a linear guide with a succession of magnetic balls, whose positions can be determined by changes in the reluctance in different magnetic circuits. This takes advantage of the fact that a displacement amount of each magnetic ball is proportional to the rotation amount of the spindle, and the rotation amount of the spindle is in turn proportional to the linear displacement of the sliding section or the nut. The positions of the balls are determined here on the basis of a reluctance change corresponding to a displacement of the balls, a cycle of reluctance change being determined by the displacement corresponding to the diameter of the ball. This publication too gives the person skilled in the art no teachings on the determination of the ball diameter itself or on the influence of a wear-related reduction of the ball diameter on the measuring accuracy of the position detection device.

The object of the present invention is to provide wear monitoring that enables detection of the wear on the rolling elements.

SUMMARY OF THE INVENTION

The problem is solved by a wear monitoring device having the features described herein. Advantageous embodiments of the invention are also described.

A wear monitoring device for a machine element is proposed which has a succession of ferromagnetic rolling elements, in particular for a ball screw or a linear bearing, for wear monitoring of the rolling elements, with at least one magnet for generating a measuring magnetic field, with a magnetic field sensor arrangement for measuring a flux density of the measuring magnetic field, the sensor arrangement having at least one first magnetic field sensor for measuring the flux density at a first measuring position and a second magnetic field sensor for measuring the flux density at a second measuring position at a distance from the first measuring position, the measuring positions being selected such that during operation of the machine element circulating rolling elements pass the measuring positions in close contact with one another and a change in the measuring magnetic field caused here is detectable at one of the measuring positions by the respective magnetic field sensor, and with an evaluation unit connected to the magnetic field sensor arrangement for recording and evaluating the flux densities measured by the magnetic field sensors, the evaluation unit being configured, on the basis of a comparison of the flux densities measured by the magnetic field sensors, to determine diameters and/or changes in the diameters of the rolling elements.

The measuring principle of the wear monitoring device in accordance with the invention is based on the fact that the rolling elements affect, due to their ferromagnetic properties, the path of the field lines of the measuring magnetic field, so that local changes in the flux density compared with the unaffected measuring magnetic field and which can be detected by the magnetic field sensor arrangement are generated by the rolling elements. To effect these local changes in the measuring magnetic field, it is necessary for the rolling elements to be made from a ferromagnetic material, for example iron, cobalt or nickel, or contain sufficient proportions of ferromagnetic material. It is also conceivable that the rolling elements have permanent-magnetic properties, and for example can generate their own magnetic field.

In this case, it may also be possible to dispense with a magnet for a measuring magnetic field.

The idea underlying the invention is that wear of the rolling elements is accompanied by a reduction in the size or in the diameter of the rolling elements which is due to material abrasion and/or deformation of the rolling elements. If the circulating rolling elements pass the magnetic field sensor arrangement in close contact with one another, this leads to the pitch, i.e. the distance between the rolling element centre points, being reduced as the diameter of the rolling elements continuously decreases. In that connection, the feature whereby circulating rolling elements pass the measuring positions in close contact with one another must be understood to mean that between two adjacent rolling elements there is no intermediate space at least in the area of the measuring positions and in the area between the measuring positions, i.e. the adjacent rolling elements contact one another. To permit a measurement of the flux density of the measuring magnetic field, the magnetic field sensor arrangement is arranged inside the measuring magnetic field. For performing the comparison of the measured flux densities and determining the diameters or the changes in the diameters of the rolling elements, it is advantageous that the machine element is in operation. During a movement of the rolling elements in the circulation direction, the magnetic field sensor arrangement can determine a sinusoidal course, where two magnetic field sensors spatially offset in the circulation direction can determine wear on the basis of a resultant phase shift.

The wear monitoring device in accordance with the invention takes advantage of the fact that in the event of a wear-related reduction in the rolling element diameter the pitch, i.e. the distance between two adjacent rolling elements, and more precisely the distance between its centre points or centres of gravity, is reduced.

Since the distance between the measuring positions is fixed, the reduction of the diameter leads to the respective flux densities measured at the first and the second measuring positions for different rolling element diameters being different from one another with otherwise identical conditions.

If for example two adjacent rolling elements are considered, whose centres of gravity starting from an original diameter are located precisely at the first or the second measuring position, a wear-related decrease of the diameter leads, for example if one rolling element is located precisely at the first measuring position, to the other rolling element no longer being exactly located at the second measuring position, but instead at a slightly diverging position. The result of this is that for example the flux densities measured at the first measuring position for both wear states are identical, but the flux densities measured at the second measuring position differ from one another depending on wear. This difference can be used by the evaluation unit to determine, on the basis of these differing flux densities or flux density ratios, the diameters or the wear-related changes in the diameters of the rolling elements.

The evaluation unit can be configured to emit, on the basis of the diameters or diameter changes determined, a wear detection signal, where said wear detection signal can embody a measure for the diameter decrease or represent the undershooting of a threshold value for the diameter.

According to an advantageous embodiment of the invention, the determination of the diameter and/or of changes in the diameter of the rolling elements comprises the determination of distances between the centres of gravity, in particular of mean values of the distances over at least one subset of the rolling elements. As already explained in the foregoing, the diameters of the rolling elements are therefore determined not directly, but indirectly by determination of distances between the centres of gravity of directly adjacent rolling elements or of a row of three or even more rolling elements. Considering mean values for the distances in circulating rolling elements avoids a supposedly greater wear being mistakenly detected for individual rolling elements due to measurement tolerances.

According to a further advantageous embodiment, the evaluation unit is configured for recording and evaluating time paths of the flux densities measured by the magnetic field sensors. When the rolling elements move through the measuring magnetic field, the respective measured flux densities change periodically. These periodic paths of the flux densities can be recorded, in particular saved and evaluated.

In particular, the comparison of the flux densities measured by the magnetic field sensors can comprise the determining of a time difference, in particular of a phase difference between the time paths of the flux densities measured by the magnetic field sensors. In the case of moving rolling elements, a phase shift between the time paths of the flux densities measured by the first and second magnetic field sensors can thus be determined from the periodic time paths of the flux densities. Furthermore, an amplitude change in the signal values is detectable. The phase shift or phase difference can be used as a measure for the wear on the rolling elements, since the phase shift represents the diameter of the rolling elements, and changes in the phase shift represent changes in the diameter of the rolling elements. In particular, several rolling elements are already averaged by determining the time difference or phase difference. Nonetheless, an amplitude change can be considered alternatively or additionally as a measure for wear.

Movement of the rolling elements past the magnetic field sensors results in a sinusoidal periodic signal, the frequency of which initially depends on the circulation velocity. If at a constant circulation velocity a reduction in the wavelength of the signal or an increase in the frequency of the signal path occurs, this is a measure for a decreasing diameter of the rolling elements. Advantageously, consideration of the phase difference in the signal paths of two magnetic field sensors offset in the circulation direction U can represent a measure for wear regardless of the circulation velocity. This is because consideration of the phase difference can be used, regardless of the circulation velocity, i.e. even with varying or changing circulation velocities, since this is a relative measurement based on differential scanning of the sinusoidal signal fluctuation which is caused by moving rolling elements through a constant magnetic field.

According to a further advantageous embodiment of the invention, the distance between the measuring positions is smaller than the nominal diameter of the rolling elements, preferably smaller than half the nominal diameter, in particular equal to a quarter of the nominal diameter. The nominal diameter of the rolling elements is understood in the present context as the original diameter without abrasion-related or deformation-related reductions. By adjusting the distance between the measuring positions to the nominal diameter of the rolling elements, diameter changes can be particularly precisely recorded. In particular when the distance between the measuring positions is approximately equal to half of or a quarter of the nominal diameter or diverges no more than 10%, at most 20% therefrom, diameter changes can be particularly precisely determined. If for example the centre of gravity of a rolling element is located precisely at the first measuring position, there is a gap or an intermediate space precisely at the second measuring position between this rolling element and the adjacent rolling element. This leads to the difference between the respective measured flux densities being a maximum. If the time paths of the flux densities measured at the first and the second measuring positions are considered, a phase shift of 90° between the two signal paths can be observed here. This phase shift changes with increasing wear of the rolling elements.

In a further advantageous embodiment, the first magnetic field sensor and the second magnetic field sensor can each comprise a measuring bridge with two half bridges. The half bridges of the two magnetic field sensors can be arranged in the circulation direction U nested and offset relative to one another. The magnetoresistive bridge resistors of each half bridge can preferably be at a distance in the circulation direction U, i.e. the longitudinal extent of the half bridges is aligned in the circulation direction U of the rolling elements. Each half bridge comprises two individual bridge resistors, at least one, in particular both bridge resistors, having magnetoresistive properties and being able to measure a change of the magnetic field—in particular stray fields—caused by the rolling elements. Due to the axial longitudinal orientation of the bridge resistors in the circulation direction U, where the two bridge resistors of each half bridge can be axially aligned in the circulation direction U, each half bridge spans a large area of the nominal diameter of the rolling element, a diameter change being detectable by a signal change in the measuring bridge. If furthermore the bridge resistors of both magnetic field sensors are arranged in the circulation direction U nested and spatially offset relative to one another, then both magnetic field sensors record different diameter areas of the rolling element, a comparison of a phase change and/or of an amplitude change of the signals determinable from both magnetic field sensors representing a measure for a changing diameter of the moving rolling elements.

In an advantageous development of one of the two aforementioned embodiments, the distance between adjacent half bridges of the two nested magnetic field sensors can correspond to approximately a quarter of the diameter of a rolling element, the distance between two magnetoresistive bridge resistors of each individual half bridge of an individual magnetic field sensor corresponding to approximately half the diameter of a rolling element. If the distance between half bridges of the two magnetic field sensors corresponds to a quarter of the diameter of a rolling element, one magnetic field sensor can, in the case of a sinusoidal course of the moving rolling elements in the circulation direction, determine the upper and the lower maximum of the signal path, and the other magnetic field sensor can determine the two areas of the greatest signal variation in the area of the zero crossings of the signal path caused by the movement of the rolling element. A difference in the signal paths, if possible a norm of the two signal paths such as a Euclidean norm, results in a very stable phase value. A change in the phase value or of a quantity derived therefrom is an indicator for a decreasing diameter of the rolling element and can be monitored with little wiring expenditure.

According to a further advantageous embodiment of the invention, the magnet is designed as a permanent magnet, in particular as a dipole magnet, whose magnetic field covers the measuring positions. In particular, this ensures that the measuring magnetic field is homogeneous at least in the area of the measuring positions and has largely the same flux density. By using a permanent magnet, the power consumption of the wear monitoring device can be kept low. Instead of a single magnet, two or more magnets can also be used. Further, electromagnets can also be used instead of permanent magnets.

According to a further advantageous embodiment, the wear monitoring device comprises a guide channel for the rolling elements, the magnetic field sensor arrangement and the magnet being arranged on a scanning wall of the guide channel. The guide channel can be designed such that a mounting position particularly advantageous for magnetic scanning of the rolling elements can be provided here for the magnetic field sensor arrangement and/or the magnet. This is explained in more detail below. The guide channel can in particular be an integral part of the wear monitoring device. The guide channel is preferably linear, however with a curved course also being possible.

Advantageously a magnetic field exit surface of the magnet runs parallel to the scanning wall. It has become clear that particularly good magnetic scanning of the rolling elements is possible as a result. The field lines here are as a rule vertical to a movement direction of the rolling elements at least close to the exit surface.

As a general principle, the magnet can however also be arranged such that a magnetic field exit surface of the magnet runs vertical or also in another direction relative to the scanning wall.

It has proved advantageous when the flux density of the measuring magnetic field and/or the material and/or the thickness of the scanning wall are selected such that rolling elements detected by the measuring magnetic field are attracted by the measuring magnetic field preferably regardless of position towards the scanning wall, where in particular rolling elements detected by the measuring magnetic field also mutually attract. By the attraction of the rolling elements to the scanning wall it is ensured that the rolling elements are always in a defined relative position. In particular when the rolling elements have, due to the design or due to advanced wear, lateral clearance in the guide channel, it is avoided that the measurement result is falsified by unsuitable positioning of the rolling elements in the guide channel. It would thus be conceivable that the rolling elements are alternatingly laterally displaced relative to one another, which would then lead, at least when the rolling elements are still in mutual contact with one another, to the distances between the centres of gravity of the rolling elements being reduced relative to the measurement distance defined by the two measuring positions.

By a suitable configuration of the measuring magnetic field, it can in particular also be ensured that the rolling elements are pressed against one another at least in the area of the magnetic sensor arrangement, so that no gaps appear between two adjacent rolling elements which might falsify the measurement result. To achieve the required high flux density for generating the effects described above, it can also be provided, beside the selection of a sufficiently strong magnet, that the guide channel or at least the scanning wall consists of non-magnetic material. Alternatively or additionally, the scanning wall can also be thinned to minimize the distance between the rolling elements and the magnet. By sufficient attraction of the rolling elements to the scanning wall it can in particular be ensured that the rolling elements can be attracted to the guide channel wall even against gravity, enabling a position-independent use of the wear monitoring device.

Advantageously, the magnetic field sensor arrangement comprises magnetoresistive magnetic field sensors, in particular AMR, CMR, TMR or GMR magnetic field sensors. These sensor types, also known as xMR magnetic field sensors, are distinguished from Hall sensors, which can also be used, by an up to 50 times higher sensitivity. The aforementioned magnetoresistive sensors are based on the anisotropic magnetoresistance (AMR) effect, the colossal magnetoresistance (CMR) effect, the tunnel magnetoresistance (TMR) effect or the giant magnetoresistance (GMR) effect. These types of magnetic field sensor are direction-selective, i.e. they can determine the amount and direction of a magnetic field component, and are therefore ideally suitable for magnetic field angle determination. Advantageously, every magnetic field sensor can comprise several, in particular two or four magnetoresistive resistance elements, which are connected up in a manner known per se to form a Wheatstone measuring bridge, in particular a Wheatstone half bridge or a Wheatstone full bridge. For this, the magnetoresistive resistance elements can also be spatially distributed in a suitable manner.

As a rule, wear monitoring can, starting from a new state or calibrated state, indicate a worn state of the rolling elements by a comparison of a change in a phase value or amplitude behaviour of both magnetic field sensors. This ensures monitoring relative to a calibrated state.

As a rule, the velocity of the linear movement or of the thread drive and the movement velocity of the rolling elements do not directly depend on one another. Typically, the rolling element movement is less than the linear travel movement or the thread drive, however in specific applications a direct correlation between the drive movement and the movement of the rolling elements can be derived. In these cases, the wear monitoring device can advantageously comprise a speed sensor determining a speed of the ball screw or a position or velocity sensor determining a movement velocity of the linear bearing, the evaluation unit incorporating geometrical parameters of the ball screw or of the linear bearing and the speed or movement velocity for determination of the diameter and/or changes in the diameters of the rolling elements. Geometrical parameters can be a pitch of the ball screw, diameter of the ball screw and length of a bypass of the ball screw, but also the ratio of rolling element track length to the longitudinal dimension of a linear bearing or similar. On the basis of sensor data, which can also comprise a drive current of a drive motor or a torque of the ball screw or an acceleration force of the linear bearing, an improved absolute monitoring of the wear state can be enabled. The sensor data can determine the movement velocity of the rolling elements. This permits an inference of, for example, speed or movement velocity to the occurring signal frequency, so that on the basis of a measurement signal even of a single magnetic field sensor of the magnetic field sensor arrangement and taking into account the movement path of the ball screw or of the linear bearing in the circulation direction U, the diameter of the rolling element can be inferred. It is thus possible to enable, alternatively or additionally to relative monitoring, absolute monitoring by taking into account further geometrical parameters and sensor data. It is also very simple to detect any damage to the guide channel walls that might slow down the movement of the rolling elements.

The invention further relates to a ball screw with a wear monitoring device according to one of the preceding embodiments, the wear monitoring device being arranged on a ball return channel of the ball screw. A ball screw is a screw gear with balls inserted between bolt and nut. Both parts each have a screw-like groove, the grooves together forming a screw-like tube filled with balls. During rotation between bolt and nut the balls roll inside their tube and move towards the front end of the nut. There they are received and passed through a tube, mostly running parallel to the screw axis and also referred to as the ball return channel, to the rear end of the nut and re-introduced into the screw-like tube. Ball screws are used in particular in machine tools, so a particularly high precision with the lowest possible bearing clearance is sought. In particular an axial clearance, which leads in high-velocity drives in particular to unwelcome latency periods in the event of a direction reversal, should be kept as small as possible. Since the rolling elements as a rule circulate in a closed circuit, direct wear monitoring proves difficult. The use of a wear monitoring device in accordance with the invention has proven to be particularly advantageous here.

BRIEF DESCRIPTION OF THE DRAWINGS

Further advantages are revealed by the drawing and the associated description of the drawing. The drawing shows examples of the invention. The drawing, the description and the claims contain many features in combination. A person skilled in the art will expediently also consider these features individually and combine them into meaningful further combinations.

The figures show in:

FIGS. 1a and 1b are schematic representation of a wear monitoring device arranged on a guide channel and according to an example with different magnetic pole alignments, respectively

FIGS. 3a and 3b are schematic views of the wear monitoring device of FIGS. 1a and 1b, including associated signal paths for measured magnetic flux densities, in each case for rolling elements with differing diameter;

DETAILED DESCRIPTION OF THE PREFERRED EMBODIMENTS

Figure 2A:
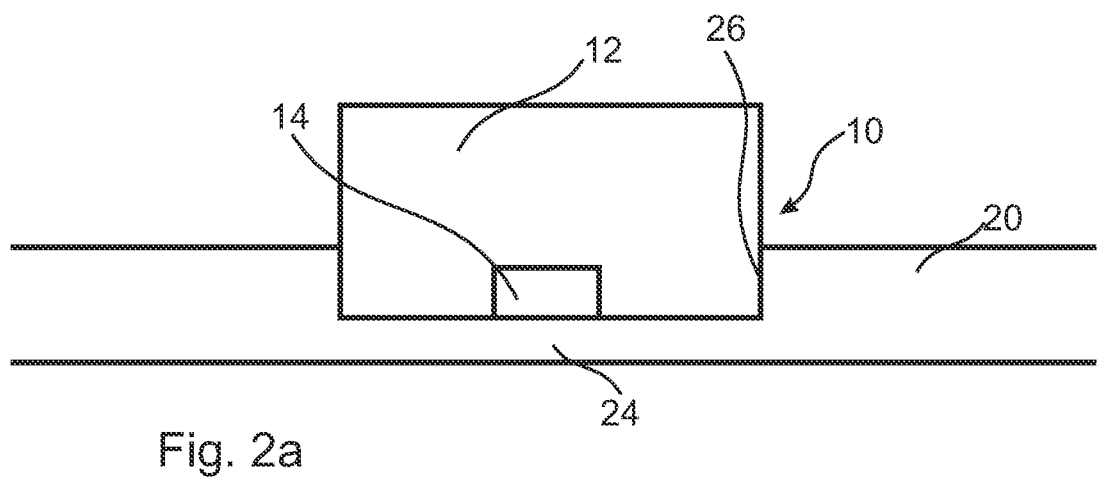
FIGS. 2a and 2b are various detailed views of a detail of the wear monitoring device of FIGS. 1a and 1b, partly in a modification.

The same reference numerals have been used in the following for identical or similar elements.

FIG. 1 shows in two sub-images FIG. 1a and FIG. 1b a wear monitoring device 10 according to an example which is arranged on a guide channel 20 of a machine element, for example a return channel of a ball screw or of a linear bearing. A plurality of rolling elements 22, which move in a circulation direction U, is held in the guide channel 20. The cross-section of the guide channel 20 is only slightly larger than the diameter of the rolling elements 22, so that a kind of forced guidance for the rolling elements 22 is achieved. The rolling elements 22 are for example spheres, but can, depending on the design of the machine element, also be formed by any other solids of revolution.

The wear monitoring device 10 comprises a magnet 12 designed as a dipole which is arranged on an outer wall of the guide channel 20. The magnetic polarity of the magnet 12 is indicated by the prefix "N" for north and "S" for south, where a reversed polarity can of course also be selected.

In FIG. 1a the magnet 12 is arranged on the guide channel 20 such that the field lines (not shown) exiting from or entering a magnetic field exit surface of the magnet 12 exit the magnet 12 vertically to the circulation direction U, the field lines at the magnetic pole being vertical to the scanning wall 24 of the guide channel 20. The magnetic field lines thus pass in the sheet plane through the rolling elements 22.

In FIG. 1b, the pole alignment of the magnet 12 is selected such that the field lines once again exit the pole surfaces of the magnet 12 vertically to the circulation direction U, where they are aligned on the pole surfaces tangentially to the longitudinal extent of the scanning wall 24 of the guide channel 20. To that extent the magnetic field lines penetrate the rolling elements 22 in the sheet direction.

The magnetic field sensor arrangement 14 is directly connected to the magnet 12 such that they are arranged directly adjacent, and they are placed on the surface of the guide channel 20. A carrier PCB can here be advantageously arranged between the magnetic field sensor arrangement 14 and the magnet 12. The magnetic field sensor arrangement 14 can comprise a first magnetic field sensor 16 and a second magnetic field sensor 18 at a distance from one another in the circulation direction U—shown as an example in FIGS. 3a, 3b and 4, 5. The distance between the magnetic field sensors 16, 18 is about half of the nominal diameter of the rolling elements 22. The magnetic field sensors 16, 18 can comprise one or more magnetoresistive resistance elements or also Hall sensors. The arrangement and connecting of such resistance elements is known in principle and explained in more detail with reference to FIG. 4.

The area of a wall of the guide channel 20, which is covered by the magnet 12 or the magnetic field sensor arrangement 14, is also referred to in the following as the scanning wall 24.

The circulating ferromagnetic rolling elements 22 are drawn into the measuring magnetic field generated by the magnet 12 and drawn to or pressed against the scanning wall 24 even against the force of gravity. The usual toroidal path of the magnetic field lines of a dipole magnet also has the effect that the rolling elements 22 are at the same time pressed against one another in the area of the measuring magnetic field, such that the rolling elements 22, more precisely the centres of gravity of the rolling elements 22, run past the magnetic field sensor arrangement in a straight line and without gaps between adjacent rolling elements 22. Due to their ferromagnetic properties, the rolling elements 22 change locally the magnetic flux density, said flux density or its changes being recorded by the magnetic field sensors 16, 18.

The wear monitoring device 10 further comprises an evaluation unit (not shown), which is connected to the magnetic field sensor arrangement 14 and is provided for recording and evaluating the magnetic flux densities measured by the magnetic field sensors 16, 18. The evaluation unit is configured to determine, on the basis of a comparison of the flux densities measured by the magnetic field sensors 16, 18, the diameters or changes in the diameters of the rolling elements. This is explained in more detail below.

FIG. 2 shows various detailed views of a wear monitoring device 10 arranged on a guide channel 20 and according to various modifications.

In the arrangement according to FIG. 2a, the guide channel 20 can consist of a ferromagnetic material. To ensure that the measuring magnetic field has a sufficient strength, the wall thickness of the guide channel 20 is reduced in the area of the scanning wall 24. The wall thickness can be preferably thinned to 0.1 to 0.2 mm to permit a sufficient magnetic field penetration, where the magnetic field can magnetically attract and guide, closely adjacently, preferably the rolling elements, in particular balls, so that they can pass closely adjacently the magnetic field sensor arrangement 14. For that purpose, a recess 26 is set into the wall on an outer face of the guide channel 20. In the recess 26, the magnetic field sensor arrangement 14 can be moved closer to the rolling elements 22, possibly allowing the strength of the magnet 12 to be reduced.

Figure 2B:
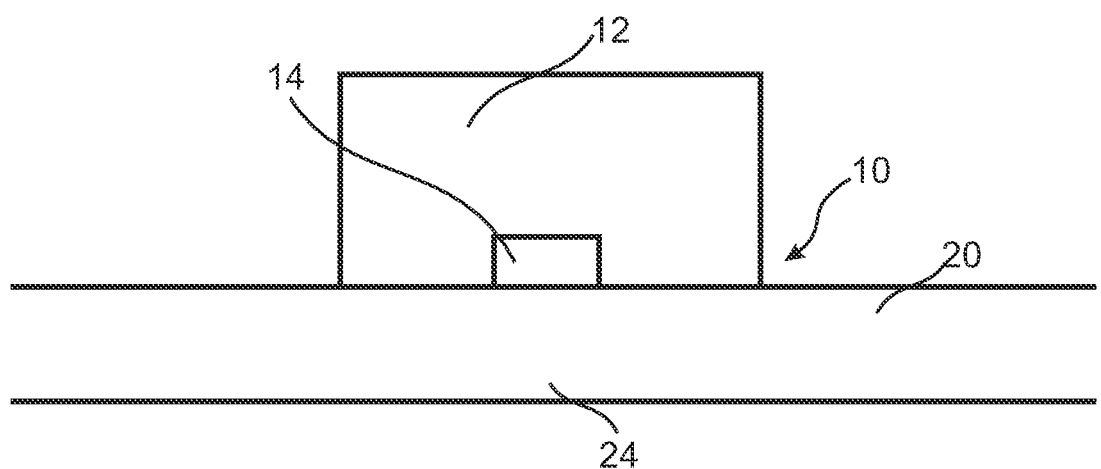

The modification of the arrangement according to FIG. 2b corresponds substantially to the example of FIG. 1, different dimensions of the wear monitoring device 10 having no importance here. The scanning wall 24 here has the same thickness as the wall of the guide channel 20 in the other areas. To achieve a sufficient penetration of the scanning wall 24 by the measuring magnetic field, the material of the guide channel 20 expediently consists of a non-magnetic material.

With reference to FIG. 3, the mode of operation of the wear monitoring device 10 is explained in more detail in the following.

Figure 3B:
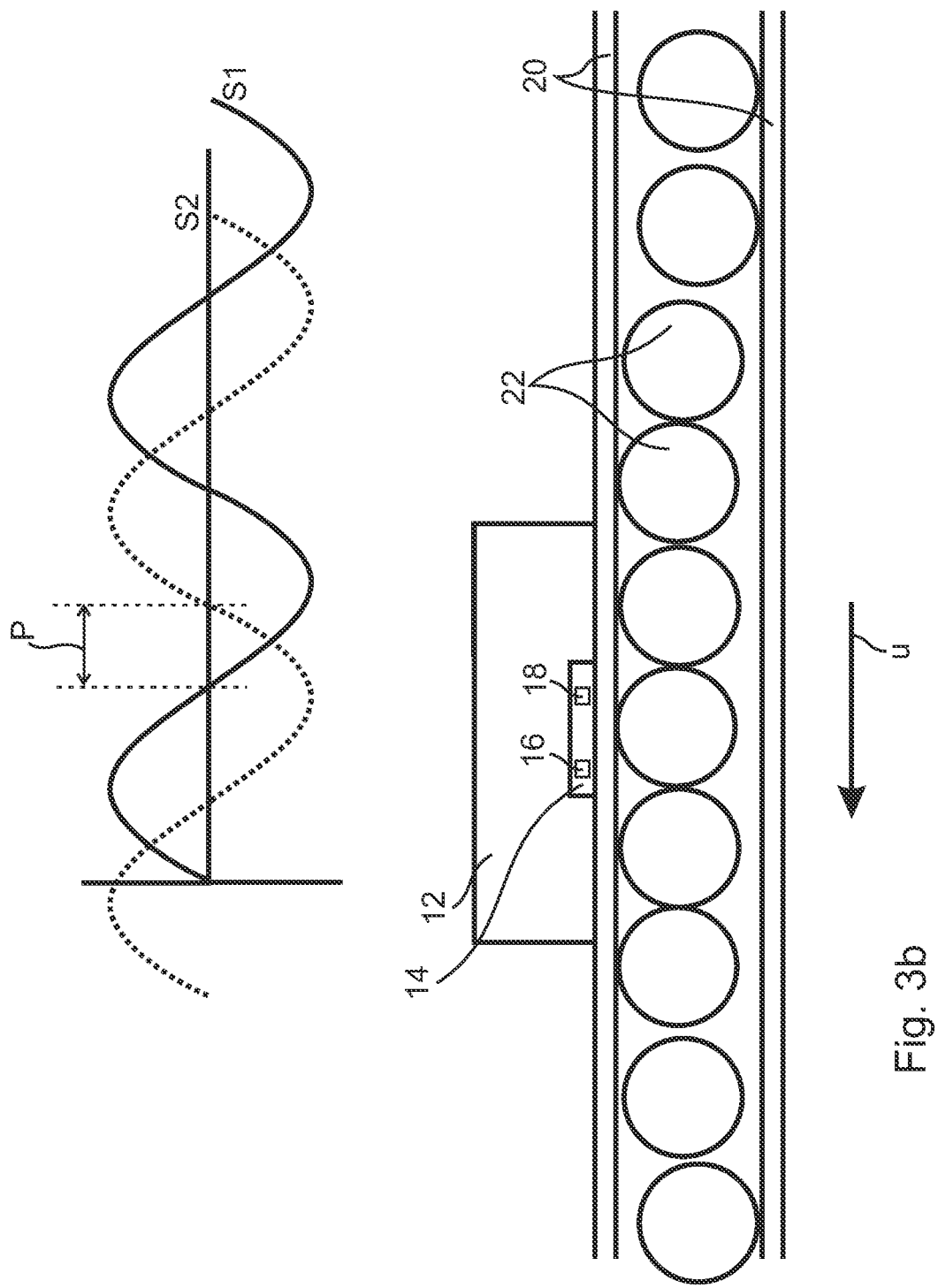

The sub-figures FIG. 3a and FIG. 3b of FIG. 3 each show the wear monitoring device 10 and the guide channel 20 including the rolling elements 22 circulating therein. While the rolling elements 22 in FIG. 3a are new and therefore have their nominal diameter, the rolling elements 22 of FIG. 3b have already undergone a certain degree of wear, which has led to a reduction in their diameter. It should be noted that the size ratios selected are not to scale.

The upper portions of FIGS. 3a and 3a each show time paths of the flux densities measured by the magnetic field sensors 16, 18. The measurement curve S1 shown with a continuous line represents in each case the flux density path determined by the first magnetic field sensor 16, while the measurement curve S2 shown in a dashed line represents the flux density path determined by the second magnetic field sensor 18.

Due to the distance between the magnetic field sensors 16, 18 in the circulation direction U, the measurement curves S1, S2 are phase-shifted relative to one another. A resultant phase difference P is indicated appropriately in FIG. 3.

As can be readily discerned in FIG. 3a, the distance between the magnetic field sensors 16, 18 is selected such that the measurement curves S1, S2 for rolling elements 22 with nominal diameter are phase-shifted precisely by 90° to one another. It is assumed here that the measurement curves S1, S2 have an approximately sinusoidal or cosinusoidal path.

A comparison of FIG. 3a with FIG. 3b shows that with increasing wear of the rolling elements 22, i.e. with decreasing diameter, the measurement curves S1, S2 shift relative to one another, which leads, with the selected definition of the phase difference P, to a reduction of the latter. The phase difference P thus represents a measure for wear, i.e. for the change in the diameter of the rolling elements 22.

The evaluation of the signals generated by the magnetic field sensor arrangement 14 is performed in suitable manner in the evaluation unit. In particular, time-averaging of the measured phase difference P can take place. The evaluation can in particular be performed independently of direction, so that a determination of the rolling element diameters or of their change can also be performed for rolling elements 22 circulating against the circulation direction U and even for stationary rolling elements 22, where in the latter case a somewhat higher measurement error may have to be accepted due to the absence of any possibility for averaging.

Figure 4:
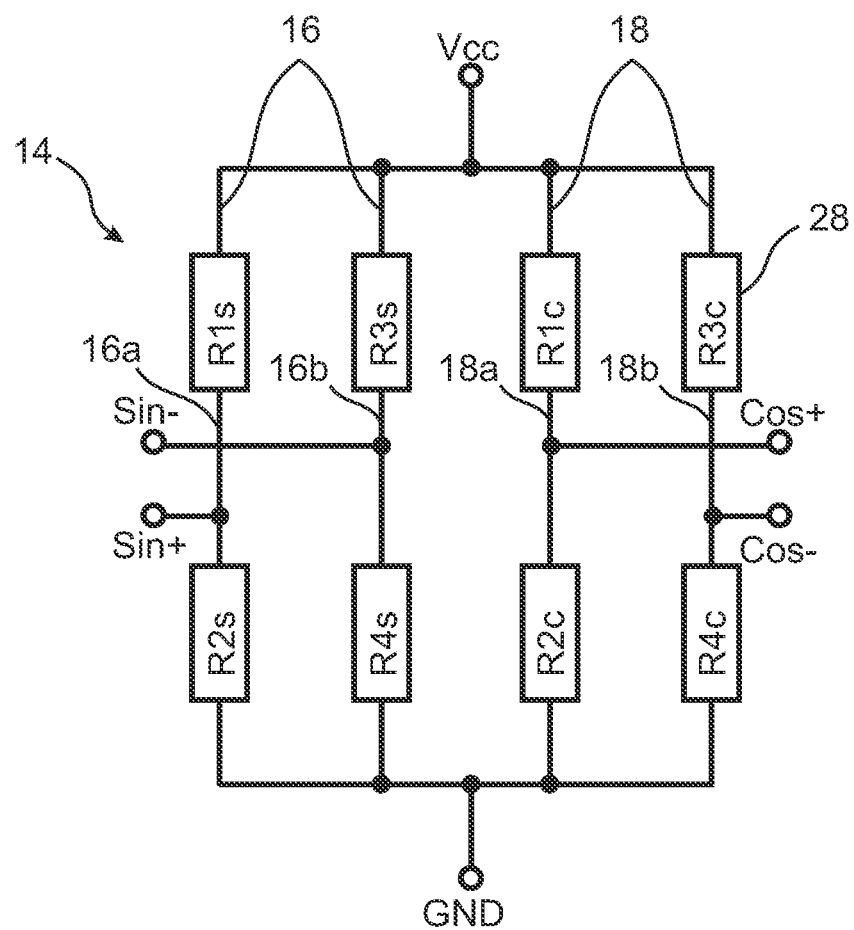
FIG. 4 is a schematic diagram of a measuring bridge configuration of a magnetic field sensor arrangement according to an example.

FIG. 4 schematically illustrates a measuring bridge configuration of a magnetic field sensor arrangement 14. The measuring bridge configuration 14 is made up of two measuring bridges, which respectively define a first magnetic field sensor 16 for a sine component and a second magnetic field sensor 18 for a cosine component. Each measuring bridge is in turn made up of two half bridges 16a, 16b and 18a, 18b with resistor pairs R1-R2 and R3-R4 using magnetoresistive bridge resistors 28 which are connected to a supply voltage between a supply voltage potential VCC and the return line potential GND. Between each resistor pair R1-R2 and R3-R4 of each half bridge 16a, 16b and 18a, 18b respectively, part of the sensor signal of the sine component SIN+, SIN− and of the cosine component COS+, COS− can be picked up by a centre tap. The voltage difference between the two taps SIN+& SIN− and COS+& COS− corresponds to a sensor signal of a magnetic field sensor 16, 18. If the magnetic field sensors 16, 18 are each at a distance of a quarter of a rolling element nominal diameter, a difference of the two sensor signals would remain constant if the diameter of the rolling elements does not change. In the event of wear, however, the signal difference would change, with this representing a measure for diameter change.

Figure 5:
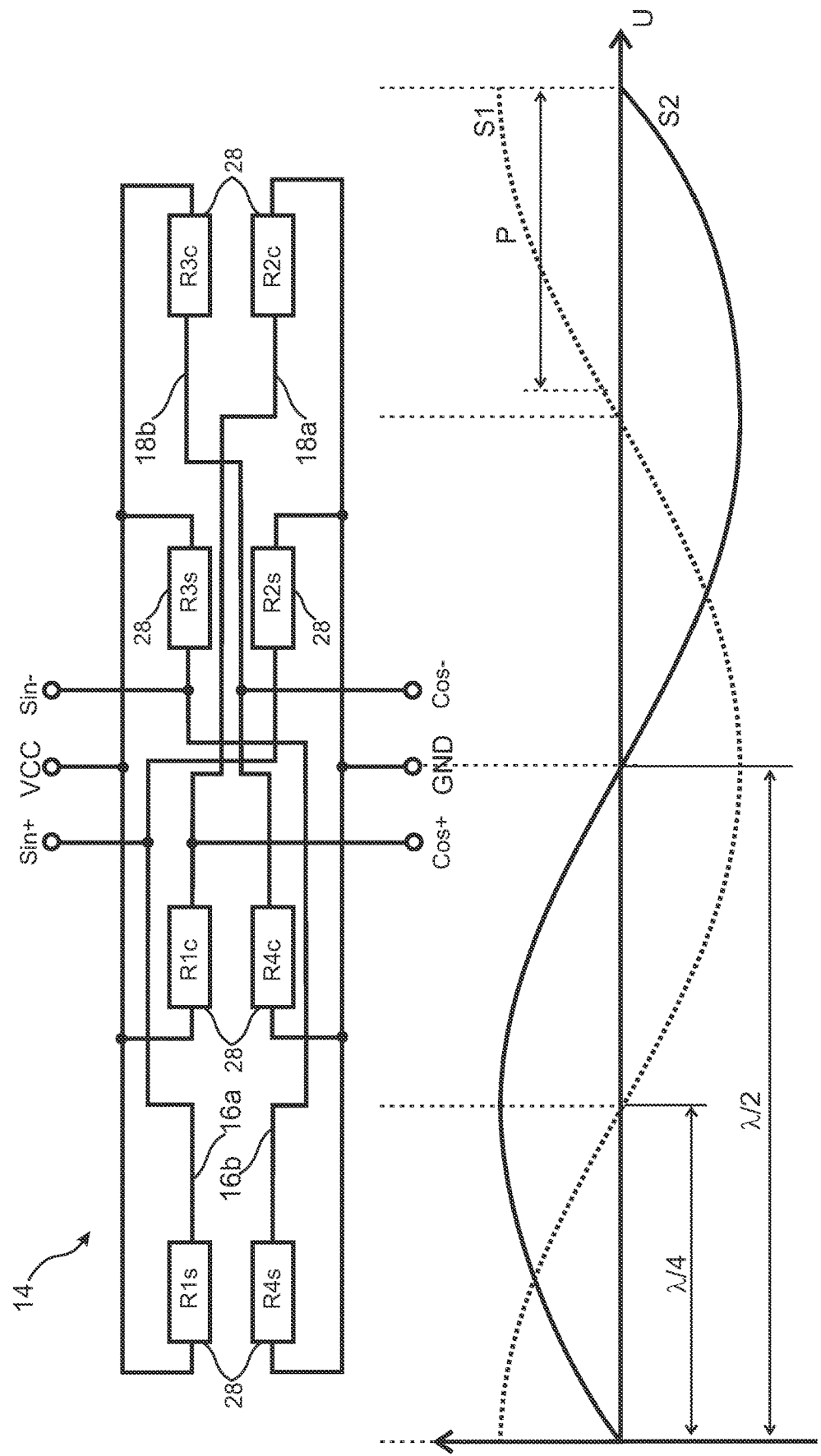
FIG. 5 is a schematic diagram of a measuring bridge configuration of a magnetic field sensor arrangement according to a further example.

The above FIG. 4 shows a possible circuit configuration of the magnetic field sensor arrangement 14. FIG. 5 shows an advantageous spatial position of the magnetic field sensors 16, 18 made up of two measuring bridges relative to a circulation direction U of the rolling elements. FIG. 5 shows both the spatial arrangement of the individual magnetoresistive bridge resistors 28 of each magnetic field sensor 16, 18 and a possible wiring of the two measuring bridges. Two half bridges 16a, 18a and 16b, 18b of the first and second magnetic field sensors 16, 18 respectively are arranged offset in the circulation direction U and nested with one another and have a distance between the half bridges 16a to 18a and 16b to 18b of □/4, □□advantageously corresponding precisely to a nominal diameter of a rolling element. The individual bridge resistors 28 of each half bridge 16a, 16b, 18a, 18b of each magnetic field sensor 16, 18 are here □/2 apart in the circulation direction U.

If the rolling elements 22 move in the movement direction U through a measuring magnetic field of a magnet 12, the magnetic field measured by the magnetic sensor arrangement 14 changes sinusoidally depending of the movement velocity and size of the rolling elements 22. Advantageously the rolling elements 22 have a diameter corresponding substantially to a distance □, resulting in a maximum and stable sensor value difference between the measured values of the first and second magnetic field sensors 16, 18, since the first magnetic field sensor can measure just one maximum value while the other magnetic field sensor can measure a zero crossing.

The diameter of a rolling element can therefore have for example a nominal diameter of 3 mm, with the associated bridge resistors 28 of each half bridge 16a, 16b or 18a, 18b of a magnetic field sensor 16 or 18 being 1500 μm apart and the half bridges 16a, 18a and 16b, 18b of the two magnetic field sensors 16, 18 having a distance of 750 μm apart. The sizes can of course be scaled to the corresponding size of a rolling element 22, and further half bridges or several magnetic field sensors can also be provided to monitor a larger area using sensors. On the basis of a phase comparison of the measured values SIN+/− with COS+/− of the two magnetic field sensors 16, 18, a phase difference P can be determined during movement of the rolling elements 22, and a change in this phase difference can be used as a measure for wear. For example, a calibration can take place as part of a teaching process with new rolling elements 22, i.e. having their nominal diameter. The evaluation unit can for example have a wear indicator which continuously indicates the currently determined diameter and/or a divergence from the calibrated nominal diameter.

Alternatively or additionally, a threshold value detector can also be provided which emits a suitable visual, acoustic or other warning signal when the currently determined diameter of the rolling elements 22 falls below a predefined threshold value.

REFERENCE NUMERAL LIST 10 wear monitoring device
12 magnet
14 magnetic field sensor arrangement
16 first magnetic field sensor
16a, 16b half bridges of the first magnetic field sensor
18 second magnetic field sensor
18a, 18b half bridges of the second magnetic field sensor
20 guide channel
22 rolling elements
24 scanning wall
26 recess
28 magnetoresistive bridge resistor
P phase difference
S1, S2 measurement curve
U circulation direction

The invention claimed is:

1. A wear monitoring device for a succession of ferromagnetic rolling elements, the wear monitoring device comprising:
    at least one magnet for generating a measuring magnetic field;
    a magnetic field sensor arrangement for measuring a flux density of the measuring magnetic field, the magnetic field sensor arrangement comprising;
        at least one first magnetic field sensor for measuring the flux density at a first measuring position; and
        a second magnetic field sensor for measuring the flux density at a second measuring position at a distance from the first measuring position;
        wherein the measuring positions are positioned such that the rolling elements pass the measuring positions in contact with one another and a change in the measuring magnetic field caused thereby is detectable at one of the measuring positions by the respective magnetic field sensor;
    an evaluation unit connected to the magnetic field sensor arrangement for recording and evaluating the flux densities measured by the magnetic field sensors, the evaluation unit being configured, on the basis of a comparison of the flux densities measured by the magnetic field sensors, to determine diameters and/or changes in the diameters of the rolling elements; and
    the evaluation unit further being configured for recording and evaluating periodic time paths of the flux densities measured by the magnetic field sensors;
    wherein the comparison of the flux densities measured by the magnetic field sensors comprises determining a phase difference between the periodic time paths of the flux densities measured by the magnetic field sensors.

2. The wear monitoring device according to claim 1, wherein the determining of changes in the diameter of the rolling elements comprises a determining of distances between centers of gravity.

3. The wear monitoring device according to claim 2, wherein the determining of distances between centers of gravity comprises determining of differences of mean values of the distances over at least one subset of the rolling elements.

4. The wear monitoring device according to claim 1, wherein the distance between the measuring positions is smaller than a nominal diameter of the rolling elements.

5. The wear monitoring device according to claim 4, wherein the distance between the measuring positions is smaller than half the nominal diameter or is equal to a quarter of the nominal diameter.

6. The wear monitoring device according to claim 1, wherein the first magnetic field sensor and the second magnetic field sensor each comprise a measuring bridge with two half bridges, said half bridges of the two magnetic field sensors being arranged in the circulation direction and are nested and offset relative to one another, the half bridges each having magnetoresistive bridge resistors, the magnetoresistive bridge resistors of each half bridge being at a distance in the circulation direction.

7. The wear monitoring device according to claim 6, wherein a distance between adjacent half bridges corresponds to approximately a quarter of the diameter of a rolling element, the distance between two magnetoresistive bridge resistors of each half bridge of a magnetic field sensor corresponding to approximately half the diameter of a rolling element.

8. The wear monitoring device according to claim 1, wherein the magnet is a permanent magnet having a magnetic field covering the measuring positions.

9. The wear monitoring device according to claim 8, wherein the permanent magnet is a dipole magnet.

10. The wear monitoring device according to claim 1, further comprising a guide channel for the rolling elements, the guide channel having a scanning wall, the magnetic field sensor arrangement and the magnet being arranged on the scanning wall.

11. The wear monitoring device according to claim 10, wherein a magnetic field exit surface of the magnet is parallel or vertical to a longitudinal extent of the scanning wall in the circulation direction.

12. The wear monitoring device according to claim 10, wherein the flux density of the measuring magnetic field and/or the material and/or the thickness of the scanning wall are selected such that rolling elements detected by the measuring magnetic field are attracted by the measuring magnetic field.

13. The wear monitoring device according to claim 12, wherein the rolling elements detected by the measuring magnetic field are attracted by the measuring magnetic field regardless of position towards the scanning wall and the rolling elements detected by the measuring magnetic field also mutually attract.

14. The wear monitoring device according to claim 1, wherein the magnetic field sensor arrangement comprises magnetoresistive magnetic field sensors.

15. The wear monitoring device according to claim 14, wherein magnetoresistive magnetic field sensors are AMR, CMR, TMR or GMR magnetic field sensors, or Hall sensors.

16. The wear monitoring device according to claim 1, wherein the evaluation unit is configured to emit a warning signal when the determined diameter of the rolling elements falls below a predefined threshold value.

17. The wear monitoring device according to claim 1, wherein the wear monitoring device is arranged on a ball return channel of a ball screw.

\* \* \* \* \*